United States Patent [19]

Dunn, Jr.

[11] 4,355,007

[45] Oct. 19, 1982

[54] TWO STAGE CHLORINATION PROCESS FOR ALUMINUM VALUE CONTAINING SOURCE

[76] Inventor: Wendell E. Dunn, Jr., Star Rte. 68D, Lead, S. Dak. 57754

[21] Appl. No.: 255,552

[22] Filed: Apr. 20, 1981

[51] Int. Cl.³ .................... C01G 35/00; C01G 33/08; C01F 7/56; C01G 49/10
[52] U.S. Cl. ........................................ 423/79; 423/74; 423/135; 423/136; 423/343; 423/149
[58] Field of Search ............... 423/111, 133, 135, 136, 423/496, 74, 79, 343

[56] References Cited

U.S. PATENT DOCUMENTS

| | | | |
|---|---|---|---|
| 1,528,039 | 3/1925 | Wolcott | 423/135 |
| 1,600,216 | 9/1926 | Dearborn | 423/136 |
| 1,605,098 | 11/1926 | Dearborn | 423/136 |
| 1,875,105 | 8/1932 | Muggleton et al. | 423/136 |
| 1,982,194 | 11/1934 | Brode et al. | 423/136 |
| 3,627,483 | 12/1971 | Cole et al. | 423/135 |
| 3,865,920 | 2/1975 | Dunn | 423/74 |

FOREIGN PATENT DOCUMENTS

| | | | |
|---|---|---|---|
| 713192 | 8/1954 | United Kingdom | 423/111 |
| 470499 | 8/1972 | U.S.S.R. | 423/111 |

*Primary Examiner*—Herbert T. Carter

[57] ABSTRACT

A two stage process is described for chlorinating aluminum value containing materials such as bauxite, clay, fly ash, etc. The process comprises the steps of:

(A) dehydrating the material, if necessary, at a temperature of between about 500° and about 1300° K.;

(B) chlorinating the product of step (A) in the presence of chlorine and carbon at a temperature below about 1200° K. and under conditions which provide chlorination of a majority of the iron present in the clay without substantial chlorination of titania values which may be present therein with concommittant formation of an iron chloride cloud above the surface of the chlorination reaction mixture;

(C) introducing oxygen into the iron chloride cloud under conditions to cause oxidation of a majority of the iron chloride contained in the cloud; and (D) chlorinating the non-gaseous product of step (B) in the presence of chlorine and carbon at a temperature above about 1300° K. but below the fusion temperature of silica containing components and under conditions sufficient to chlorinate substantially entirely the alumina, titania and silica values contained therein.

1 Claim, 1 Drawing Figure

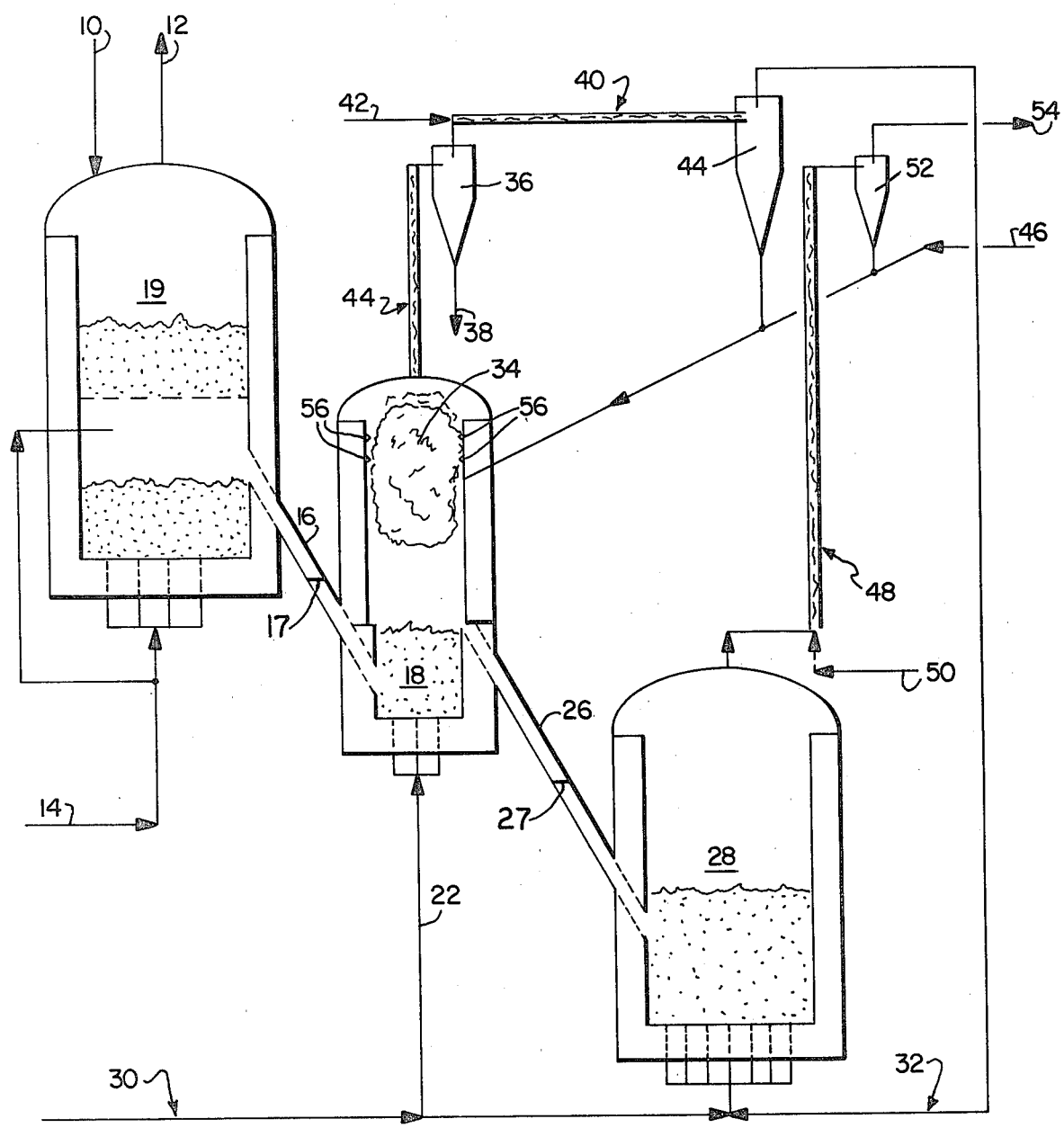

TWO STAGE CHLORINATION PROCESS FOR ALUMINUM VALUE CONTAINING SOURCE

FIELD OF THE INVENTION

This invention is directed toward the opening of bauxite mineral to obtain its aluminous values, more particularly toward a chlorination process to produce aluminum chloride or alumina derived from aluminum chloride.

BACKGROUND OF THE INVENTION

Aluminum has been traditionally obtained from bauxites by the Bayer process, now highly developed particularly for low silica containing ores. More recently other leaching processes involving acids have been studied as routes to alumina.

Since World War II interest has been building in a chloride route to aluminum to take advantage of savings in electricity and electrode costs incidental to the use of a chloride reduction cell, and this interest has spawned a number of process concepts to convert bauxites to aluminum chloride. These processes include chlorination of Bayer process aluminas with carbon monoxide and chlorine, carbon and chlorine (where the carbon has been intimately deposited on the alumina surface) by, for example, H. P. Alder et al, Metallurgical Society of AIME, TMS Paper Selection, LM-79-16. and A. Lansberg, Metallurgical transactions, Vol. GB, P. 207, June, 1965 and carbon and chlorine chlorinations where carbon or coke are separate solid phases (see for example U.S. Pat. No. 4,124,682). The use of the more expensive alumina is to avoid later purification of aluminum chloride which would be contaminated with iron, silicon and titanium chlorides were directly chlorinated bauxite the aluminum source.

More recently, direct chlorination of bauxites has been considered using either carbon monoxide or carbon as a reducing agent for simultaneous chlorination and reduction of the oxides of the bauxites. It has been observed by many that a preferential chlorination of iron, silicon and titanium oxides can be carried out although not to the extent that the bauxite is beneficiated to an alumina pure enough to be suitable for direct cell addition or pure enough to allow chlorination to as pure an aluminum chloride as could be made by Bayer alumina chlorination.

One of the necessities for an economic chloride aluminum extraction process is the recovery of chlorine values from the impurity chlorides produced from bauxite chlorination. Although both silicon and titanium tetrachlorides have adequate thermodynamic potential for the oxidation of these chlorides at any temperature, unfortunately this is not the case with ferric chloride. Consequently processes which make ferric chloride, such as ilmenite beneficiation or titanium tetrachloride production from ilmenites have long been faced with the problem of chlorine recovery and to date have not successfully demonstrated such recovery on a commercial scale.

Among the difficulties of the ferric chloride oxidation are the maintenance of heat balance and the establishment of adequate oxidation reaction rates within the bounds of thermodynamic constraints on the ferric chloride oxidation reaction equilibrium. Where the ferric chloride is collected as a solid, it is difficult to maintain reactor temperatures high enough to get adequate reaction rates without adding heat, a particularly difficult task in such a corrosive system. Direct addition of heat across a boundary invites corrosion of the heat transfer surface while heat generation by combustion in the reactor results in significant dilution of the chlorine formed.

OBJECTS OF THE INVENTION

It is therefore an object of this invention to provide a process which will convert the oxides in bauxite or clay to chlorides in such a manner that the iron, silicon and titanium chlorides may be reconverted to oxides with recovery of their chlorine values if desired without the necessity of adding heat to conduct the chloride oxidation reaction. It is a further object of this invention to provide a chlorination reaction of the aluminous values at sufficient rate that chlorine fed to the reactor will be substantially consumed in a single pass while any excess chlorine absorbed in the liquid chloride products of the reaction, can be recovered and recycled along with chlorine recovered from the chloride impurities from the bauxite chlorination, without further cleanup or repressurization if so desired.

It is also an object of the invention to prevent the loss of chlorine values to HCl generated by the reaction with contained water and hydroxyls inherent in the bauxite ore.

SUMMARY OF THE INVENTION

A two stage process is described for chlorinating aluminum value containing materials such as bauxite, clay, fly ash, etc. The process comprises the steps of:

(A) dehydrating the material, if necessary, at a temperature of between about 500 and about 1300° K.;

(B) chlorinating the product of step (A) in the presence of chlorine and carbon at a temperature below about 1200° K. and under conditions which provide chlorination of a majority of the iron present in the clay without substantial chlorination of titania values which may be present therein with concommittant formation of an iron chloride cloud above the surface of the chlorination reaction mixture;

(C) introducing oxygen into the iron chloride cloud under conditions to cause oxidation of a majority of the iron chloride contained in the cloud; and (D) chlorinating the non-gaseous product of step (B) in the presence of chlorine and carbon at a temperature above about 1300° K. but below the fusion temperature of silica containing components and under conditions sufficient to chlorinate substantially all the alumina, titania and silica values contained therein.

I have found that although it is not possible to make a complete separation of the oxide impurities from the alumina in a preliminary and partial chlorination of the bauxite, it is possible to make a substantial reduction in the amount of iron remaining after a preliminary or first stage chlorination and, more important, it is possible to separate the majority of the iron from the bauxite while leaving the titania behind with the aluminum. This is important because while iron chloride has an insignificant commercial value, titanium tetrachloride has a high commercial value and is a readily usable and saleable by product whose production impacts favorably on the overall economics of the process. I have found that it is possible to eliminate water and hydroxyls from bauxite and prevent chlorine loss to HCl in the chlorinators while retaining adequate reactivity of the dried bauxite to a chlorine/carbon reaction conducted in a fluidized bed.

The reaction technique used to recover chlorine from iron chloride described in U.S. Pat. No. 3,865,920 can be adapted to recover chlorine from the impurity products of bauxite, clay or other aluminum value source chlorination even though these impurity chlorides are generated in a succeeding stage or stages of chlorination. Thus silicon tetrachloride can be recycled to the first stage gas space and participate in a chlorine salvaging reaction along with the oxidation of ferric chloride.

By the use of a two stage chlorination it is possible to handle conveniently the oxidation reaction by the by-product chlorides to recover the chlorine and separate the condensation of the bulk of the iron from the condensation of the aluminum chloride by condensing most of the iron chloride before the aluminum chloride has been formed. The second stage of chlorination provides a convenient sink for chlorine regenerated from impurity chlorides by oxidation.

The process of this invention will produce aluminum chloride from bauxite, including high silica bauxites, for use in aluminum chloride reduction cells or for conversion to alumina for conventional Hall-Heroult cells. The process will also recover chlorine from impurity chlorides generated and provide an environmentally suitable waste oxide for disposal.

DESCRIPTION OF THE DRAWINGS

FIG. I shows a diagram of an apparatus suitable for carrying out the two stage chlorination process of the present invention.

DETAILED DESCRIPTION OF THE INVENTION

Although the removal of iron by chlorine with a reducing agent to a limited extent has been demonstrated frequently, titania is also attacked. The two reactions are rapid, more rapid than a chlorination attack on the alumina of the bauxite.

The removal of iron by replacement with titanium tetrachloride, and aluminum chloride are both very rapid reactions. There is, however, a level of iron which cannot be so replaced, a level which will vary depending upon the ore but which in all or almost all bauxites will be well above a level tolerable for direct use of beneficiated bauxite as alumina.

It is evident that were one to operate a stage for selective chlorination it would be possible to retain the titanium values since they will rapidly replace the iron which would vaporize out as the chloride. Any aluminum chloride made would similarly replace the iron and not be lost.

It is also clear from extended laboratory scale chlorination times that a high degree of iron removal is not possible for some ores so a second stage of chlorination must also handle a significant amount of iron. Since iron chlorination will in no way interfere with the total ore chlorination there would seem to be no reason to use a preliminary chlorination stage just to separate a portion of the iron. However, the opportunity to conduct a gas phase reaction using the exit heat content of a portion of the gases arising from the fluidized chlorinator bed solves the problem of oxidation of impurity chlorides including the iron and any other oxidizable chlorides from which one wishes to recover the chlorine. See, for example, U.S. Pat. No. 3,865,920.

The use of a double stage eliminates the need for a separate oxidation stage while at the same time reducing the size of the succeeding chlorination stage. There is also the possibility of operating the partial chlorination stage at higher velocity since the particles are heavier upon entrance and do not chlorinate away to extinction. Thus the dust losses are reduced.

FIG. I shows an apparatus for carrying out a double or two stage chlorination while recovering the chlorine values from the impurity chlorides using the first chlorinator both to chlorinate and to oxidize. Ore and coke are fed into a drying preheater at 10. Combustion gases exit at 12. Air and oxygen are fed to the two stages from 14 and the partially dried and preheated coke-ore mixture over flows through 15 and leaves through a pressure sealed transfer line 16 to the first chlorination stage bed in reactor 18. The first chlorination stage is fed chlorine through 22. Products of the cloud oxidation and combustion gases from the chlorination exit through a flue cooler 24. The bed overflow is transferred through 26 to the second chlorination stage 28. This stage receives its chlorine from the main chlorine recycle supply 30 and also from the first stage through 32. Pressure seals 17 and 27 serve to maintain appropriate material and gas flows.

The cloud oxidation takes place in the gas space of 34 above the fluidized bed. The ferric oxide, unreacted chloride and $O_2$, ferric chloride, and the combustion gases exit through 24, a cooling flue, where the gases cool in passage and are cycloned in 36 to remove the iron oxide at 38. The gases then pass through cooling flue 40 where they are cooled well below the condensation point of $FeCl_3$. Flue 40 may be scrubbed with solids 42 to prevent pluggage. These solids are additional bed feed for the first stage chlorinator transported with the condensed ferric chloride after cycloning in cyclone 44 as recycle to the cloud by oxygen entering at 46. The ferric chloride recycle is accompanied by ferric chloride trapped from the second chlorination stage after condensation in flue 48 which is also scrubbed 50 with dried ore destined for the first stage reactor.

The chlorination gases after the cyclone 52, are taken off at 54 for condensation of aluminum chloride and the remaining impurity chlorides principally titanium and silica tetrachlorides. Chlorine can be absorbed from the exit second stage gas in liquid chlorides which are later condensed from stream 54. Chlorine absorbed can be returned with silicon tetrachloride liquid to the cloud for oxidation and recycle. Dust from both chlorinators and all oxides formed from impurity chlorides are eliminated at stream 38 after collection in cyclone 36.

The vapors rising from the fluidized chlorinator bed are immediately oxidized without condensation directly above the chlorinator bed by the addition of oxygen through one or a plurality of jets 56 converting a fraction of the ferric chloride to ferric oxide and chlorine. Any ferrous chloride produced by the chlorinator is sequentially oxidized to ferric chloride and then to ferric oxide. The resulting gases from this "cloud" oxidation along with the oxides produced leave the reactor and are cooled to a temperature still above the condensation point of the ferric chloride dimer and cycloned to remove oxides and dust which leave the cyclone and are stripped of interstial gases before disposal.

The gas stream then proceeds from the cyclone to a scrubbed flue condenser where the ferric chloride is condensed for return to the cloud to vaporize and cool the cloud to a temperature between 700° and 1100° C.

The gases produced by the chlorination of the entering dry preheated aluminum value source are predominately carbon dioxide and iron chlorides. After cloud oxidation and condensation the exit gas transferred to the next chlorination stage is predominately chlorine and carbon dioxide with a small oxygen concentration. Excess oxygen is fed to the cloud to control the heat balance by controlling the amount of oxidation and hence the unreacted ferric chloride.

The first stage chlorination reactor 18 is fed a mixture of carbon and bauxite or alumina containing ore with adequate carbon fed for complete chlorination of the bauxite or ore. The overflow bed from the first stage contains the aluminum oxide along with titanium and silicon oxides which are to be subsequently chlorinated. Dust losses are taken in the first chlorination stage as well as in the second although these stages may be operated at lower velocities than the preheater to minimize downstream dust losses.

Although not wishing to be bound by theory, it is believed that any titanium tetrachloride produced in the first stage chlorinator replaces the ferric oxide in the bauxite and so is recaptured. Small amounts of chlorides other than iron chlorides which escape will be oxidized in the cloud above the bed and their chlorine values recaptured. The aluminum value source residue, consisting of, depending upon the raw material, alumina and the remaining impurities, predominately titanium and silicon oxides, with the excess carbon, overflow the bed and are transferred to the second chlorination stage where they undergo total alumina chlorination to form an exit gas stream of aluminum, titanium, silicon and trace element chlorides.

Bauxites and clays which contain silicas that do not chlorinate rapidly will tend to build up a silica residue in the second chlorinator which may be purged from time to time to restore the concentration of partially chlorinated bauxite or clay and to avoid some of the silica chlorination.

The first stage of chlorination can be operated at higher pressure than the second stage in order to allow gas recycle from the cloud without repressurization. Use of two stages reduces the area necessary for the second chlorinator.

Preparation of the ore feed is primarily the mixing with the carbon for generation of heat for the subsequent chlorination reactions. Preheating should be to a temperature to drive off all water and hydroxyls and to produce the desired heat balance for the first chlorination stage which follows. The preheater may be either single or multiple staged. Where multiple stages are employed there can be more efficient use of the drying heat generated and in some cases the possibility of using cheaper sources of carbon e.g. coal which can be coked as it passes downward from lower to higher temperature stages. The ash content of carbon sources is not as important in bauxite chlorination as in titania chlorination since any iron in the coke ash is converted to iron chlorides from which the chlorine can be recovered. Any alumina values in the carbon feed may be chlorinated.

The following examples will serve to better illustrate the successful practice of the two stage chlorination process described herein.

EXAMPLE 1

The first chlorination stage of bauxite chlorination is illustrated by the following operation. A Refractory lined preheater of 7' outside diameter and an inner diameter of 5.5' is operated with a 24" bed depth using air and oxygen to bring the solids to about 1100 K after light off. A feed stream of bauxite of composition shown in Table I is mixed with 10×50 mesh Great Lakes Petroleum Coke to give a bed content of approximately 25% carbon and fed to the preheater. After solids flows are established the overflow passes into the first chlorination stage through a transfer leg (fluidized bed) to insure isolation of the gas streams to the preheater and the chlorinator. The first stage filled similarly with a carbon/bauxite mixture is lighted off and brought to temperature so that the overflow from the preheater enters a hot bed fluidized with air at the proposed operating temperature. When flow is established and overflow from the first chlorinator stage has commenced chlorine is fed to the chlorination stage at approximately 90%, the balance of the flow gas being nitrogen, air or oxygen to control the reactor temperature. The quantities are given in Table II.

Product gases rise from the fluidized bed of similar depth and dimension as the preheater and are oxidized in the gas space above. This space has no refractory lining being water cooled mild steel of 7' diameter. Oxygen is added through a jet located 3' above the fluidized bed surface to oxidize the ferric chloride produced in the lower fluidized bed zone. The gases pass from the top of the reactor and the ferric chloride is condensed after the solids are removed by cyclone. The ferric chloride is recycled with the oxygen stream. The cloud temperature can be controlled by the oxygen excess which determines the amount of ferric chloride which is unreacted and which is recycled as a solid to be vaporized and extract heat from the cloud. Temperatures are maintained between slightly below 800° C. and 1000° C., the lower limit representing a kinetic limitation on the reaction and the upper limit excessive ferric chloride recycle amounts. Chlorine values separated from the ferric chloride are available for the second stage where the chlorine can react with the beneficiated ore produced in the first stage. The inert and combustion gases exit with the similar gases of the second stage. The solid product composition is given in Table II.

EXAMPLE 2

Second stage chlorination can be accomplished in the same reactor as used to demonstrate the first stage of chlorination by feeding the product ore from the first stage into the preheater to bring it to the stage I exit temperature (1200 K) and overflowing it into the second stage chlorination fluidized bed. Although total chlorination takes place in the second stage, a small over feeding of the reactor with consequent overflow allows bed purging of unreacted silicates and excess coke. The overflow coke and bauxite may be recovered.

Chlorine with small amounts of oxygen for heat balance is fed to fluidize the bed with a superficial gas velocity at the bottom of the reactor of approximately 0.4'/sec. Feed compositions and flows are given in Table III. The gases exiting from the reactor are cooled and the chlorides condensed in stages. Ferric chloride is recovered and fed as recycle to the cloud reaction in the first stage operation to recover the chlorine values. Similarly the Titanium and silicon tetrachlorides can be fed to the cloud although they may be sold for their by-product value which will generally exceed the contained chlorine values.

TABLE I

|  | Run of Mine | Dried 900°C* | Stage I Product* |
|---|---|---|---|
| $Al_2O_3$ | 54.0% | 76.0 | 87.0 |
| $SiO_2$ | 3.5 | 4.9 | 5.7 |
| $Fe_2O_3$ | 10.0 | 14.0 | 1.6 |
| $TiO_2$ | 1.5 | 2.1 | 2.4 |
| Inert | 2.0 | 2.8 | 3.2 |
| LOI | 29.0 | — | — |
|  | 100 | 99.8 | 99.9 |

*Carbon free basis

TABLE II

1st Chlorination Stage Operating Conditions

| | | |
|---|---|---|
| Operating Temp., °K. | 1200 K. | 1130 K. |
| Gas Vel. (Superficial), ft./sec. | .25 | .26 |
| Space Pressure, psia | 20 | 20 |
| Bed Area, ft² | 24 | |
| Bed Height (Static) | 2 | — |
| Cloud Volume ft³ | | 231 |
| Retention Time, | | |
| Bed, Min. | 25 | — |
| Gas in cloud, sec. | | 25 |
| Solids Flow In, lbs./min. | | |
| Dried Ore, lbs./min. | 120 | |
| Coke, lbs./min. | 25 | |
| Solids Flow Out, lbs./min. | | |
| Beneficiated Ore, lbs./min | 100 | |
| Coke, lbs./min. | 20 | |
| $Fe_2O_3$, lbs./min. | | 15 |
| Gas Flow In | | |
| $Cl_2$, lbs./min. | 20 | — |
| Air SCFM | 10 | |
| $O_2$ SCFM | | 55 |
| Gas Flow Out | | |
| $Cl_2$, lbs./min. | 20 | |
| $O_2$ SCFM | 5 | |
| $FeCl_3$ | 15 | |

TABLE III

2nd Chlorination Stage Operating Conditions

| | |
|---|---|
| Operating Temperature | 1300 K. |
| Gas Vel. (Superficial) | .5'/sec. |
| Pressure | 20 |
| Fluidized Bed | |
| Area | 24 ft.² |
| Height (static) | 4 ft. |
| Retention Time, Solids | Until totally chlorinated |
| Solid Flow In | |
| Bene. Ore, lbs./min. | 16 |
| Coke, lbs./min. | 4 |
| Gas Flow In | |
| Chlorine | 33 |
| Gases Out | |
| $CO_2/CO$ ratio | 3 |
| $AlCl_3$, lbs./min. | 36 |
| $FeCl_3$ | .5 |
| $TiCl_4$ | 1 |
| $SiCl_4$ | 3 |

EXAMPLE 3

In the apparatus of the preceeding experiments, the cloud oxidation with introduction of recycle silicon and titanium tetrachloride may be conducted at a higher cloud temperature which increases the amount of heat extracted from the cloud by the vaporized unreacted recycle ferric chloride and by the products of the oxidation. Simultaneously because the thermodynamics of the ferric chloride oxidation become less favorable with an increasing temperature, it becomes necessary to increase the oxygen partial pressure in the cloud. Although this results in a slightly larger loss of oxygen and more oxygen in the recovered chlorine operation at increased temperature it has the advantage of fincreasing the reaction kinetics and the advantage of stabilizing the cloud reaction making control by oxygen flow regulation easier.

Operation at a cloud temperature of 1200° K. will increase the excess oxygen necessary to about 10%. Table (IV) gives an approximate analysis to the off gas from the reactor on a nitrogen free basis.

TABLE IV

Cloud Exit Gas Composition at 1200° K. Operation with Co-oxidation of $SiCl_4$ and $TiCl_4$ with $FeCl_3$

| | |
|---|---|
| $Cl_2$ | 51.9% |
| $FeCl_3$ | 12.9 |
| $CO_2$ | 25.9 |
| $O_2$ | 9.3 |

$N_2$ free basis

What is claimed is:

1. A two stage process for chlorinating aluminum value containing materials which also contain iron, titanium and silica comprising the steps of:
   (A) dehydrating the material at a temperature of between about 500° and about 1300° K.;
   (B) chlorinating the product of step (A) in the presence of chlorine and carbon at a temperature below about 1200° K. and under conditions which provide chlorination of a majority of the iron present in the aluminum value containing material without substantial chlorination of titania values present therein with concommittant formation of an iron chloride cloud above the surface of the chlorination reaction mixture;
   (C) introducing oxygen into the iron chloride cloud under conditions to cause oxidation of a majority of the iron chloride contained in the cloud; and
   (D) chlorinating the non-gaseous product of step (B) in the presence of chlorine and carbon at a temperature above about 1300° K. but below the fusion temperature of silica containing components and under conditions sufficient to chlorinate substantially all the alumina, titania and silica values contained therein.

* * * * *